(12) United States Patent
Kusubayashi

(10) Patent No.: US 7,728,456 B2
(45) Date of Patent: Jun. 1, 2010

(54) VEHICLE AUXILIARY ELECTRIC-POWER-SUPPLYING SYSTEM

(75) Inventor: Chiyo Kusubayashi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 971 days.

(21) Appl. No.: 10/541,245

(22) PCT Filed: Jan. 29, 2004

(86) PCT No.: PCT/JP2004/000829

§ 371 (c)(1),
(2), (4) Date: Jul. 1, 2005

(87) PCT Pub. No.: WO2005/073014

PCT Pub. Date: Aug. 11, 2005

(65) Prior Publication Data

US 2006/0145542 A1    Jul. 6, 2006

(51) Int. Cl.
*B60L 1/00*    (2006.01)
*H02J 1/00*    (2006.01)

(52) U.S. Cl. .............................. 307/9.1; 307/26; 307/28; 307/75; 307/82

(58) Field of Classification Search ................. 307/145, 307/28–29, 26, 9.1, 45, 75, 82–83; 191/23 A, 191/4, 8, 2; 363/51; 180/65.1
See application file for complete search history.

(56) References Cited

U.S. PATENT DOCUMENTS

| | | | | |
|---|---|---|---|---|
| 4,795,859 A | * | 1/1989 | Kato et al. | 191/4 |
| 4,900,992 A | * | 2/1990 | Sekizawa et al. | 318/135 |
| 5,121,315 A | * | 6/1992 | Moriya | 363/65 |

(Continued)

FOREIGN PATENT DOCUMENTS

DE    1292697    4/1969

(Continued)

OTHER PUBLICATIONS

Supplementary European Search Report dated Feb. 20, 2009, 4 pages.

*Primary Examiner*—Jared J Fureman
*Assistant Examiner*—Hal I Kaplan
(74) *Attorney, Agent, or Firm*—Buchanan Ingersoll & Rooney PC

(57) ABSTRACT

A vehicle auxiliary electric-power-supplying system can normally stop an electric power inverter by the frequency in use for an electric power supplier being suppressed as low as possible, and electric power being immediately started to be supplied from the power supplier to a controller in a case in which normal electric power has become unable to be obtained from power-outputting of the electric power inverter. The system includes: the electric power inverter for converting a first type of dc power received through an overhead wire to a second type of dc power, and supplying the second type of dc power to a dc load; the power supplier for converting the first type of dc power received through the overhead wire to a third type of dc power; a power-outputting unit, connected to both the electric power inverter and the electric power supplier, for outputting either the second type of dc power or the third type of dc power; and the controller for receiving power from the power-outputting unit, and controlling the electric power inverter.

12 Claims, 3 Drawing Sheets

U.S. PATENT DOCUMENTS

| | | | |
|---|---|---|---|
| 5,703,415 A * | 12/1997 | Tanaka | 307/66 |
| 5,796,175 A * | 8/1998 | Itoh et al. | 307/10.1 |
| 6,075,717 A * | 6/2000 | Kumar et al. | 363/87 |
| 6,278,256 B1 * | 8/2001 | Aoyama | 318/801 |
| 6,388,904 B2 * | 5/2002 | Nomura | 363/71 |
| 6,639,816 B2 | 10/2003 | Liu | |
| 6,958,552 B2 * | 10/2005 | Dodson, III | 307/52 |

FOREIGN PATENT DOCUMENTS

| | | |
|---|---|---|
| EP | 0024448 | 3/1981 |
| GB | 1066657 | 4/1967 |
| JP | 01-259704 | 10/1989 |
| JP | 06-178551 | 6/1994 |
| JP | 07-031135 | 1/1995 |
| JP | 09-308254 | 11/1997 |
| JP | 2002-27601 | 1/2002 |

* cited by examiner

VEHICLE AUXILIARY ELECTRIC-POWER-SUPPLYING SYSTEM

This disclosure is based up on International Application No. PCT/JP2004/000829, filed Jan. 29, 2004, the contents of which are incorporated by reference.

TECHNICAL FIELD

The present invention relates to vehicle auxiliary electric-power-supplying systems that supply low-voltage power, which is converted from high-voltage power, to loads such as an air conditioner and lighting fixtures installed in an electric vehicle.

BACKGROUND ART

Generally, an electric vehicle has a back-up battery therein. Moreover, a vehicle is provided therein with a vehicle auxiliary electric-power-supplying system that converts high-voltage power supplied from an overhead wire, to low-voltage power, and supplies the low-voltage power to a load installed in the vehicle. Only when electric power has been supplied from the back-up battery voltage to a controller of the vehicle auxiliary electric-power-supplying system, and the controller has operated, the entire vehicle auxiliary electric-power-supplying system has become ready to start. However, when voltage of the back-up battery decreases and does not reach enough voltage to operate the controller, the controller does not start to operate, resultantly the entire vehicle-auxiliary-electric-power-supplying- system does not operate.

Therefore, as disclosed, for example, in FIG. 1 and FIG. 2 of Japanese Laid-Open Patent Publication 259,704/1989, an electric power supplier (converter) has been provided for converting the high-voltage power, which is supplied from the overhead wire, to the low-voltage power, and supplying the electric power (electric power source) to the controller (control circuit), when the vehicle auxiliary electric-power-supplying system starts to operate. In response to the operation of the power supplier, when the vehicle starts to operate, even though the voltage of the back-up battery has decreased, the controller in the vehicle auxiliary electric-power-supplying system normally operates with electric power being supplied from the power supplier.

However, in the above described vehicle auxiliary electric-power-supplying system, there has been the following problem. The power supplier, in order to reduce its frequency in use, operates only when the vehicle auxiliary electric-power-supplying system starts to operate, then the operation is stopped after electric power has been obtained from output of an electric power inverter. If any short-circuit malfunction occurs during the starter stop, due to an affect such as a dielectric breakdown on the low-voltage side between the electric power inverter and the load, in order to stop the output from the electric power inverter, the controller needs to command the electric power inverter to stop operation. However, because normal electric power from the electric power inverter cannot be obtained due to short-circuit, and in addition, the power supplier is also stopped, the power for the controller is stopped; consequently, a normally stopping operation of the electric power inverter based on the command from the controller has been impossible.

An objective of the present invention, which has been made to solve the foregoing problem, is to obtain a vehicle auxiliary electric-power-supplying system that can suppress the frequency in use for a power supplier as low as possible, and can normally stop an electric power inverter by the power supplier being immediately started to supply electric power to a controller, even in a case in which normal electric power has become unable to be obtained from the output of the electric power inverter.

DISCLOSURE OF THE INVENTION

A vehicle auxiliary electric-power-supplying system according to the present invention includes: an electric power inverter for converting a first type of dc power received through an overhead wire to a second type of dc power, and supplying the second type of dc power to a dc load; an electric power supplier for converting the first type of dc power received through the overhead wire to a third type of dc power; a power-outputting unit, connected to both the electric power inverter and the electric power supplier, for outputting either the second type of dc power or the third type of dc power; and a controller for receiving power from the power-outputting unit, and controlling the electric power inverter; therefore, the system can suppress the frequency in use for the power supplier as low as possible, and can normally stop-the electric power inverter by the power supplier being immediately started to supply electric power to a controller, even in a case in which normal electric power has become unable to be obtained from the output of the electric power inverter.

BEST MODE FOR CARRYING OUT THE INVENTION

This invention will be described in further detail with reference to the accompanying drawings.

Embodiment 1

Figure 1:
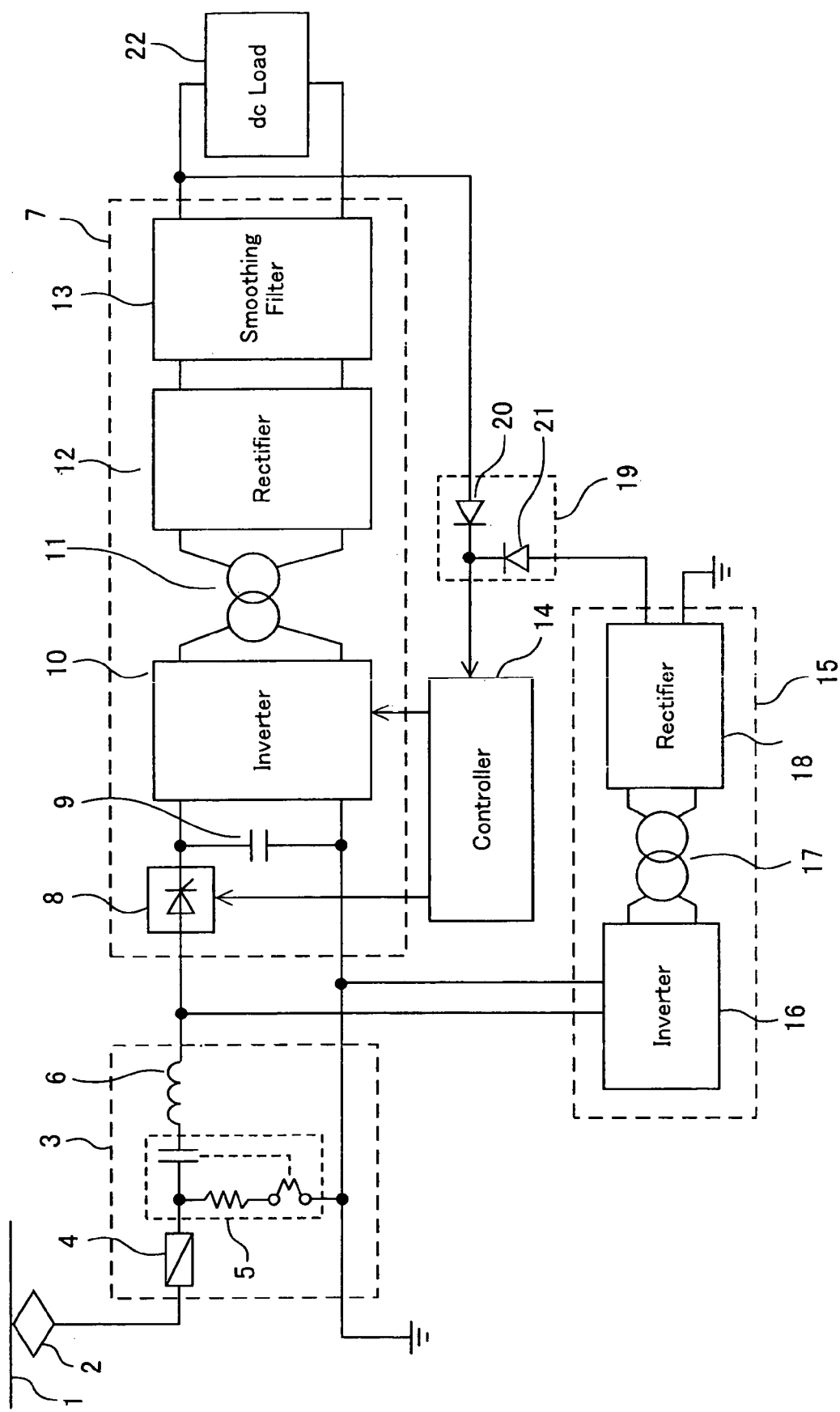
FIG. 1 is a view illustrating a configuration of a vehicle-auxiliary-electric-power-supplying system according to Embodiment 1 of the present invention.

FIG. 1 is a view illustrating a configuration of a vehicle auxiliary electric-power-supplying system according to Embodiment 1 of the present invention. In this figure, numeral 1 denotes an overhead wire, and numeral 2 denotes a pantograph; here, high-voltage power from the overhead wire 1 is supplied to the vehicle auxiliary electric-power-supplying system through the pantograph 2. As the overhead wire 1, a wire placed above ground or in a third rail of subway systems is quoted as the example.

The configuration in the vehicle auxiliary electric-power-supplying system is explained. Numeral 3 denotes an automatic starter, which is composed of a fuse 4, an electromagnetic contactor 5, and an input filter reactor 6. In the electromagnetic contactor 5, a coil, a switch, and a resistor for decreasing voltage are represented. In addition, a contactor, which is not illustrated, is provided between the resistor and the coil. A controller described later detects any excessive voltage inputted through the pantograph 2, and opens the contactor; as a result, current will not flow through the coil, enabling the switch to open. Because the contactor is normally closed, the starter automatically starts to operate; the coil is excited; the switch is closed; and then, the high-voltage power is applied to the vehicle auxiliary electric-power-supplying system. In response to excessive current through the overhead wire 1, by the fuse 4 breaking up, the connection between the overhead wire 1 and the circuits in the vehicle auxiliary electric-power-supplying system is disconnected.

Numeral 7 denotes an electric power inverter, which is composed of a charging switch 8, an input filter capacitor 9, an inverter 10, a transformer 11, a rectifier 12, and a smoothing filter 13. The electric power inverter 7 converts to low-voltage dc power high-voltage dc power inputted from the automatic starter 3, and supplies the low-voltage power to a load and the vehicle auxiliary electric-power-supplying system. A smoothing operation for the voltage obtained through the overhead wire 1 is performed using the input filter reactor 6 and the input filter capacitor 9. The charging switch 8 controls, for the purpose of protecting the input filter capacitor 9 when the vehicle starts to operate, the electric charging based on the controller described later. The inverter 10 is used for converting dc electric power into ac. The transformer 11 transforms to low-voltage power the high-voltage ac power obtained through the inverter 10. The rectifier 12 rectifies into dc power the low-voltage ac power obtained through the transformer 11. The smoothing filter 13 smoothes the low-voltage dc power obtained through the rectifier 12 so as to enable the power to be supplied to a load in the following stage.

Numeral 14 denotes a controller, which normally controls the electric power inverter 7. The controller 14, in order to protect the input filter capacitor 9, detects the electric charging state thereof (not illustrated in the figure), and outputs control signals to the charging switch 8. After the charging has been performed, the controller indicates to the inverter 10 a converting operation.

Numeral 15 is an electric power supplier, which is composed of an inverter 16, a transformer 17, and a rectifier 18. The power supplier 15 converts to low-voltage dc power the high-voltage dc power obtained through the automatic starter 3. The voltage outputted from the power supplier 15 is lower than the voltage outputted from the electric power inverter 7. Both the voltages are controlled by the coil configurations of the transformer 11 and transformer 17.

Numeral 19 is a butt-jointed diode, in which each cathode of a diode 20 and a diode 21 is butt-jointed, and connected to the controller 14. Anodes of the butt-jointed diode 19 each are connected to the smoothing filter 13 and rectifier 18, respectively. Due to the butt-jointed diode 19, higher voltage power of either the power supplied from the electric power inverter 7 or power supplier 15 is supplied to the controller 14. Although voltages of the above described electric power supplied to the butt-jointed diode 19 are different from each other, the electric power inverter 7 and the power supplier 15 are configured so that both the voltages fall within an electric power supplying range in which the controller 14 can normally operate.

Numeral 22 denotes a dc load such as lighting fixtures, to which the low-voltage dc power is supplied from the smoothing filter 13.

Next, an operation of the vehicle auxiliary electric-power-supplying system is explained.

The vehicle auxiliary electric-power-supplying system is a unit that starts to operate at first in the vehicle, and to the system, the high-voltage dc power is supplied from the overhead wire 1 through the pantograph 2. Because the electric power received through the overhead wire l has high-voltage such as 1,500 V, and the power therefore cannot be used intact in the dc load 22 of the vehicle, the power must be converted to lower voltage power of such as 100 V, and supplied to the dc load 22. The vehicle auxiliary electric-power-supplying system performs this converting.

When the vehicle system starts to operate, the high-voltage power through the pantograph 2 is supplied to the automatic starter 3. The automatic starter 3 is an input protector for protecting the power inverter 7 or power supplier 15 in the following stage against excessive high-voltage power. The high-voltage power having passed through the automatic starter 3 is supplied to the charging switch 8 in the electric power inverter 7 and the inverter 16 in the power supplier 15. At this point of time when the power is supplied to both of the units, because in the electric power inverter 7 any control signal has not yet outputted from the controller 14 to the charging switch 8, the charging switch 8 has not operated. In contrast, the power supplier 15 operates based on the high-voltage power supplied. The high-voltage power is converted from dc into ac by the inverter 16, and transformed to low-voltage by the transformer 17. The transformed low-voltage ac power is rectified into low-voltage dc power by the rectifier 18. The rectified low-voltage power is supplied to the diode 21 of the butt-jointed diode 19. To the diode 20 connected to the electric power inverter 7, the electric power is not supplied from the electric power inverter 7, and the voltage of the power supplied to the diode 21 of the butt-jointed diode 19 becomes higher than the other; therefore, the electric power is supplied to the controller 14 as the electric power source.

With electric power being supplied from this source, the controller 14 operates. The controller 14 detects a charging state (voltage, etc.) of the input filter capacitor 9, and, based on control information (not illustrated) that has been preinstalled in the controller 14, outputs to the charging switch 8 control signals in response to the detection result. The charging switch 8 controls current, when the system starts to operate, from the input filter reactor 6 to the input filter capacitor 9 based on the control signals, and protects the input filter capacitor 9 from being rapidly charged. The input filter capacitor 9 is charged up to the same voltage as that of the overhead wire 1.

After the input filter capacitor 9 has been charged up, the controller 14 outputs control signals to the inverter 10. The high-voltage dc power supplied to the inverter 10 is converted into ac based on the control signals. After having been converted into ac, the electric power is transformed to low-voltage by the transformer 11, and rectified into thee low-voltage dc power by the rectifier 12. Then, the low-voltage dc power is smoothed by the smoothing filter, and supplied to the dc load 22 and to the diode 20 of the butt-jointed diode 19.

In the butt-jointed diode 19, because the voltage supplied to the diode 20 becomes higher than that of the diode 21, the power from the diode 20 is prioritized, and supplied to the controller 14 as an electric power source.

In a case in which power from the electric power inverter 7 cannot be obtained due to a short-circuit malfunction that has occurred in the low-voltage side from the electric power inverter 7 to the dc load 22, because the electric power voltage having been supplied to the diode 20 becomes lower than the electric power voltage being supplied to the diode 21, the electric power from the diode 21, as the electric power source, is immediately supplied to the controller 14. The controller 14 outputs control signals to the charging switch 8 and inverter 10, etc. of the electric power inverter 7, and stops the operation of the electric power inverter 7.

During the electric power being supplied from the diode 20 to the controller 14, although the electric power from the diode 21 cannot be supplied due to its low-voltage, the power supplier 15 does not stop operation and remains in a standby status so as to enable electric power to be supplied at any time. If the high/low voltage relationship between the diode 20 and diode 21 is inverted, the electric power is supplied from the rectifier 18 to the controller 14 through the diode 21.

The butt-jointed diode 19 has three roles. The first role is to prevent the electric power from being supplied from the power supplier 15 to the dc load 22. The second is, in order to reduce the frequency in use for circuit elements composing the power supplier 15, to automatically switch the electric power source, which supplies power to the controller 14, from the power supplier 15 to the electric power inverter 7, after the electric power inverter 7 has started to operate and the power therefrom has been obtained. The last is to automatically switch the electric power source, which supplies power to the controller 14, from output, of the electric power inverter 7 to that of the power supplier 15, because the output voltage of the power supplier 15 becomes higher than that of the electric power inverter 7, if power from the electric power inverter 7 cannot be obtained due to a malfunction, etc.

Here, in order to ensure safety during vehicle maintenance, the pantograph 2 and the fuse 4 may be configured so as to be separable. Moreover, in a case in which the dc load 22 is a backup battery, in order to prevent battery consumption, a contactor may be provided so as to enable the smoothing filter 13 and the backup battery to be suitably separated.

As described above, in the vehicle auxiliary electric-power-supplying system according to Embodiment 1 of the present invention, because power from the power supplier 15 on standby is immediately supplied to the controller 14 through the butt-jointed diode 19, when any short-circuit malfunction occurs in the low-voltage side from the electric power inverter 7 to the dc load 22, not only the operation of the controller 14 can be maintained without breaking up the power supplier of the controller 14, but also the normal stop operational can be performed from the controller 14 to the electric power inverter 7.

Moreover, the system is configured in such a way that the automatic starter 3 that automatically starts normally without control by the controller 14, and the electric power inverter 7 that needs control by the controller 14 are separated; therefore, after the operation till the automatic starter 3 has been performed, and when the operation of the controller 14 is needed, the power supplier 15 finally starts to operate. Consequently, the operation of the power supplier 15 during the time when the controller 14 does not need to operate, can be prevented.

In a configuration such as that the electric power is selectively supplied to the controller of the vehicle auxiliary electric-power-supplying system by voltages outputted from the backup battery and the power supplier being butted at each other, if the voltage of the backup battery has not reach a suppliable voltage to the controller, even if the entire vehicle auxiliary electric-power-supplying system is in operation, the power supplier has continued to supply electric power to the controller until the voltage of the backup battery is charged up to the suppliable voltage. On the contrary, in cases in which the voltages outputted from the electric power inverter 7 and the power supplier 15 are butted at each other as represented in Embodiment 1, because the voltage of the backup battery becomes unnecessary in the vehicle auxiliary electric-power-supplying system, a time for the power supplier 15 in use, when the system starts to operate, becomes as short as the time until the power output of the electric power inverter 7 is obtained. Therefore, the frequency for the power supplier 15 in use for supplying electric power to the controller 14 can be significantly reduced; resultantly, the lifetimes of circuit elements in the power supplier 15 can be extended.

Embodiment 2

Although the vehicle auxiliary electric-power-supplying system in which only the dc electric power is outputted has been explained in Embodiment 1, a vehicle auxiliary electric-power-supplying system in which both ac electric power and dc electric power are outputted is explained in Embodiment 2.

Figure 2:
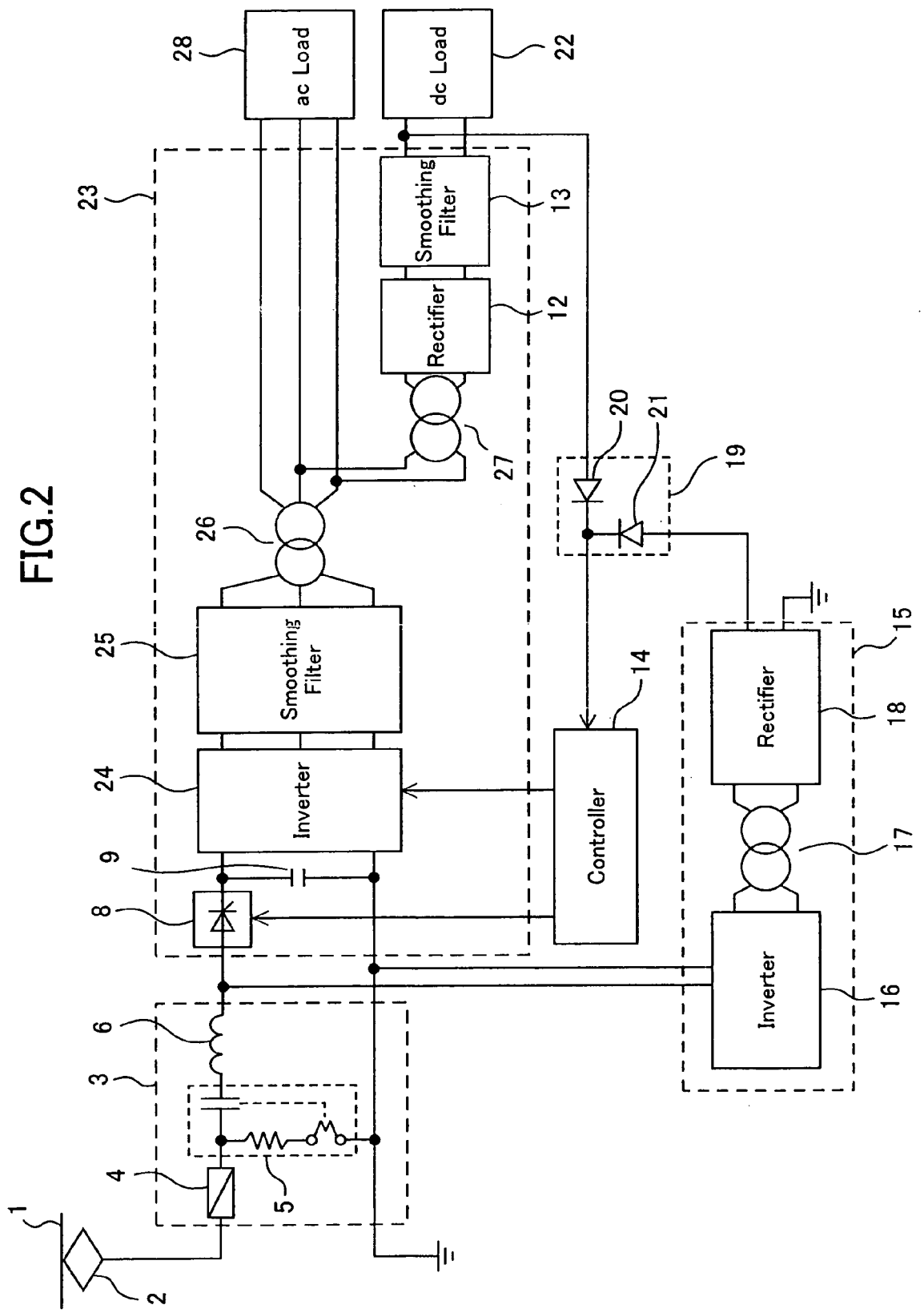
FIG. 2 is a view illustrating a configuration of a vehicle auxiliary electric-power-supplying system according to Embodiment 2 of the present invention.

FIG. 2 is a view illustrating a configuration of the vehicle auxiliary electric-power-supplying system according to Embodiment 2.

In this figure, numeral 23 denotes an electric power inverter, numeral 24 denotes an inverter, numeral 25 denotes a smoothing filter, numerals 26 and 27 denote transformers, and numeral 28 denotes an ac load. The ac load 28 includes an air conditioner. Other numerals are the same elements as those represented in Embodiment 1.

Similarly to the case in Embodiment 1, when high-voltage dc power is supplied to the inverter 24, the power is converted into high-voltage ac power in the inverter 24. Although the inverter 24 is used for converting dc into ac, single-phase electric power-outputting system as in Embodiment 1 is not used but three-phase one is employed in Embodiment 2. In order to prevent noise generation due to the transformer 26, the high-voltage ac power is smoothed by the smoothing filter 25. The smoothed power is transformed to low-voltage ac power by the transformer 26, and then supplied to the ac load 28.

The low-voltage ac power (single-phase electric power-output) from the transformer 26 is supplied to the transformer 27. The supplied electric power is further transformed to low-voltage power by the transformer 27, and then rectified by the rectifier 12 from ac into dc. The low-voltage dc power having been smoothed by the smoothing filter 13 is supplied to the dc load 22 and the diode 20 of the butt-jointed diode 19. In this embodiment, although the transformer 27 and the rectifier 12 are used, the ac three-phase power outputted from the transformer 26 may instead be rectified intact using a three-phase bridge-rectifying-circuit.

After the power-output has been obtained from the electric power inverter 23, similarly to the case in Embodiment 1, power-output from the diode 20 of the butt-jointed diode 19 is supplied as an electric power source to the controller 14.

As described above, in the vehicle auxiliary electric-power-supplying system according to Embodiment 2, an effect similar to that in the vehicle auxiliary electric-power-supplying system according to Embodiment 1 can be obtained.

Moreover, the vehicle auxiliary electric-power-supplying system can be obtained, in which electric power can be supplied to both the ac load and the dc load.

Embodiment 3

Figure 3:
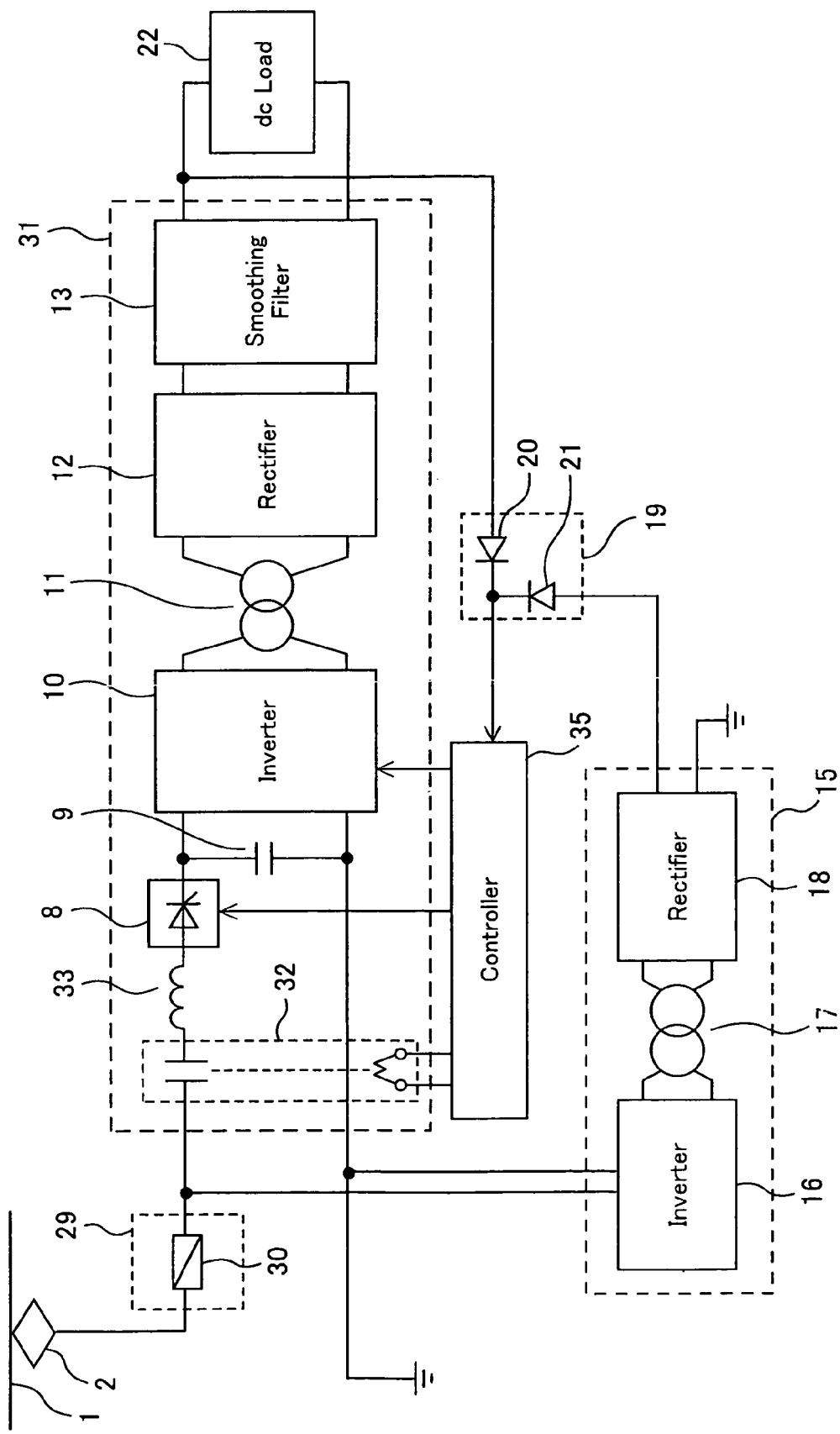
FIG. 3 is a view illustrating a configuration of a vehicle auxiliary electric-power-supplying system according to Embodiment 3 of the present invention.

FIG. 3 is a view illustrating a vehicle auxiliary electric-power-supplying system according to Embodiment 3 of the present invention. In this figure, numeral 29 denotes an automatic starter having a fuse 30. Numeral 31 denotes an electric power inverter, numeral 32 denotes an electromagnetic contactor, numeral 33 denotes an input filter reactor, and numeral 35 denotes a controller. Other numerals are the same as those represented in Embodiment 1.

In the vehicle auxiliary electric-power-supplying system according to Embodiments 1 and 2, the electromagnetic contactor 5 has been automatically started to operate using a resistor that can decrease the voltage until the system can start to operate; however, in some areas, because the voltage of the overhead wire 1 is so high that there may be cases in which an electromagnetic contactor having voltage-resistant. characteristics for enabling automatic start is not available, or the vehicle auxiliary electric-power-supplying system becomes upsized due to the upsized resistor needed for decreasing the voltage to a voltage with which the electromagnetic contactor can automatically start to operate.

In the configuration represented in FIG. 3, the automatic starter 29 in which any command from the controller 35 is not needed, when the system starts to operate, is composed of only the fuse 30. In the electric power inverter 31 in which a command from the controller 35 is needed, the electromagnetic contactor 32 and the input filter reactor 33 are installed. The fuse 30 prevents excessive current from flowing from the overhead wire 1 to the electric power inverter 31. The controller 35 detects the voltage, etc. from the automatic starter 29 (not illustrated), and controls coils of the electromagnetic contactor 32. A switch therein is opened/closed by the action of the coils. The electromagnetic contactor 32 is configured in such a way that the resistor for decreasing the voltage, in order to automatically start to operate, has been removed, and the controller 35 controls the contactor accordingly.

When the system starts to operate, the controller 35 detects the voltage of the electric power from the automatic starter 29, owing to the power-outputting from the diode 21 (not illustrated). In a case in which the voltage is higher than the voltage that the electric power inverter 31 can permit, by the controller 35 controlling the coils of the electromagnetic contactor 32, the switch is opened; consequently, the electric power inverter 31 is protected against excessive voltage through the overhead wire 1. On the other hand, in a case in which the voltage is within the permissible range, by the controller 35 controlling the coils of the electromagnetic contactor 32, the coils are excited and the switch is closed, and then the input filter reactor 33, the charging switch 8, and the input filter capacitor 9 are turned active. The fuse 30 and the electromagnetic contactor 32 each are a protector for protecting, against the electric power through the overhead wire 1, the power inputting into the electric power inverter 31. The electromagnetic contactor 32 is operated by the controller 35 controlling.

After the input filter capacitor 9 has been charged, by the controller 35 controlling, the inverter 10 is operated; consequently, the high-voltage dc power is converted into ac. Moreover, by the transformer 11, the rectifier 12, and the smoothing filter 13, the ac power is changed into low-voltage dc power. If any power-output is obtained from the electric power inverter 31, power-output from the diode 20 of the butt-jointed diode 19 is supplied to the controller 35 as an electric power source.

Because the vehicle auxiliary electric-power-supplying system according to Embodiment 3 is configured as described above, an effect similar to that in Embodiment 1 can be obtained.

Moreover, even in a case in which the voltage on the overhead wire 1 is excessively high, the vehicle auxiliary electric-power-supplying system will not be upsized.

As described above, according to the present invention, the vehicle auxiliary electric-power-supplying system can be obtained, in which the frequency in use for the power supplier is prevented as low as possible, and the electric power inverter operation can be normally stopped by electric power being immediately started to be supplied from the power supplier to the controller even in a case in which normal electric power has become unable to be obtained from the output of the electric power inverter.

The present invention is useful in electric vehicles to realize a vehicle auxiliary electric-power-supplying system, in which the frequency in use for the power supplier is prevented as low as possible, and the electric power inverter operation can be normally stopped by electric power being immediately started to be supplied from the power supplier to the controller even in a case in which normal electric power has become unable to be obtained from the output of the electric power inverter.

What is claimed is:

1. A vehicle auxiliary electric-power-supplying system comprising:
    an electric power inverter for converting first dc power received through an overhead wire to second dc power, and supplying the second dc power to a dc load;
    an electric power supplier for converting the first dc power received through the overhead wire to third dc power;
    a power-outputting unit, connected to both the electric power inverter and the electric power supplier, for outputting higher dc power of either the second dc power or the third dc power; and
    a controller for receiving power from the power-outputting unit, and controlling the electric power inverter,
    wherein the electric power inverter comprises a charging switch that controls current flowing through the overhead wire, and controls the conversion of the first dc power to the second dc power based on the control signals output from the controller.

2. The vehicle auxiliary electric-power-supplying system as recited in claim 1, wherein the electric power inverter converts the first dc power into ac power, and supplies the ac power to an ac load.

3. The vehicle auxiliary electric-power-supplying system as recited in claim 1, wherein the power-outputting unit supplies the third dc power the to the controller when the system starts to operate, and the second dc power is supplied through the power-outputting unit after the second dc power has been outputted from the electric power inverter.

4. The vehicle auxiliary electric-power-supplying system as recited in claim 3, wherein the electric power inverter converts the first dc power into ac power, and supplies the ac power to an ac load.

5. The vehicle auxiliary electric-power-supplying system as recited in claim 3, wherein the third dc power is supplied to the controller through the power-outputting unit if the voltage of the second dc power being supplied becomes lower than the voltage of the third dc power being supplied.

6. The vehicle auxiliary electric-power-supplying system as recited in claim 5, wherein the electric power inverter converts the first dc power into ac power, and supplies the ac power to an ac load.

7. The vehicle auxiliary electric-power-supplying system as recited in claim 5, wherein the power-outputting unit is comprises a butt-jointed diode composed of a first diode to which the second dc power is supplied and a second diode to which the third dc power is supplied, so as to supply output of either power to the controller.

8. The vehicle auxiliary electric-power-supplying system as recited in claim 7, wherein the electric power inverter converts the first dc power into ac power, and supplies the ac power to an ac load.

9. The vehicle auxiliary electric-power-supplying-system as recited in claim 7, further comprising:
    a protector, connected between the overhead wire and the electric power inverter, for protecting the electric power inverter against the dc power supplied through the overhead wire.

10. The vehicle auxiliary electric-power-supplying system as recited in claim 9, wherein the electric power inverter converts the first dc power into ac power, and supplies the ac power to an ac load.

11. The vehicle auxiliary electric-power-supplying system as recited in claim 9, wherein the first dc power is supplied to the electric power supplier through the protector.

12. The vehicle auxiliary electric-power-supplying system as recited in claim 11, wherein the electric power inverter converts the first dc power into ac power, and supplies the ac power to an ac load.

* * * * *